UNITED STATES PATENT OFFICE.

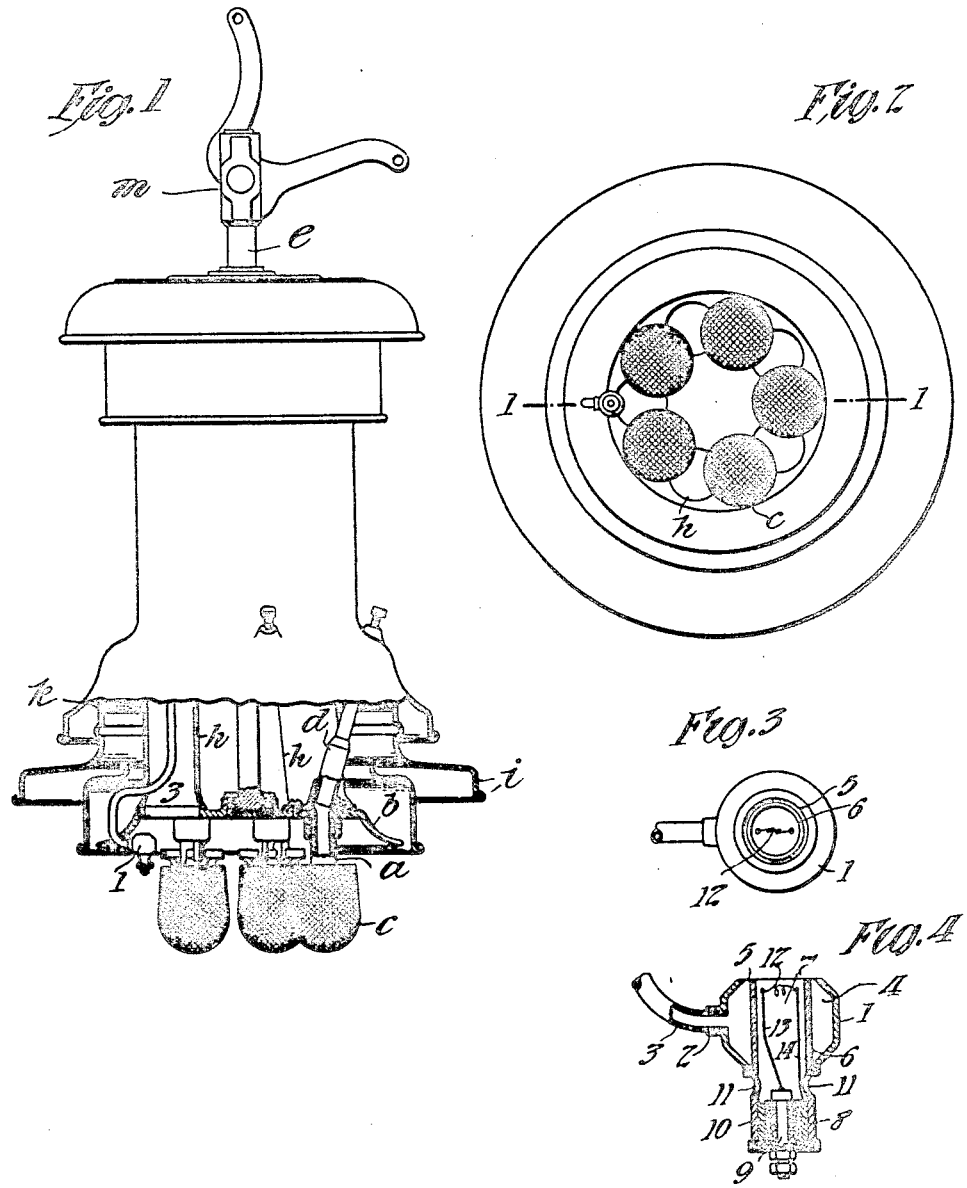

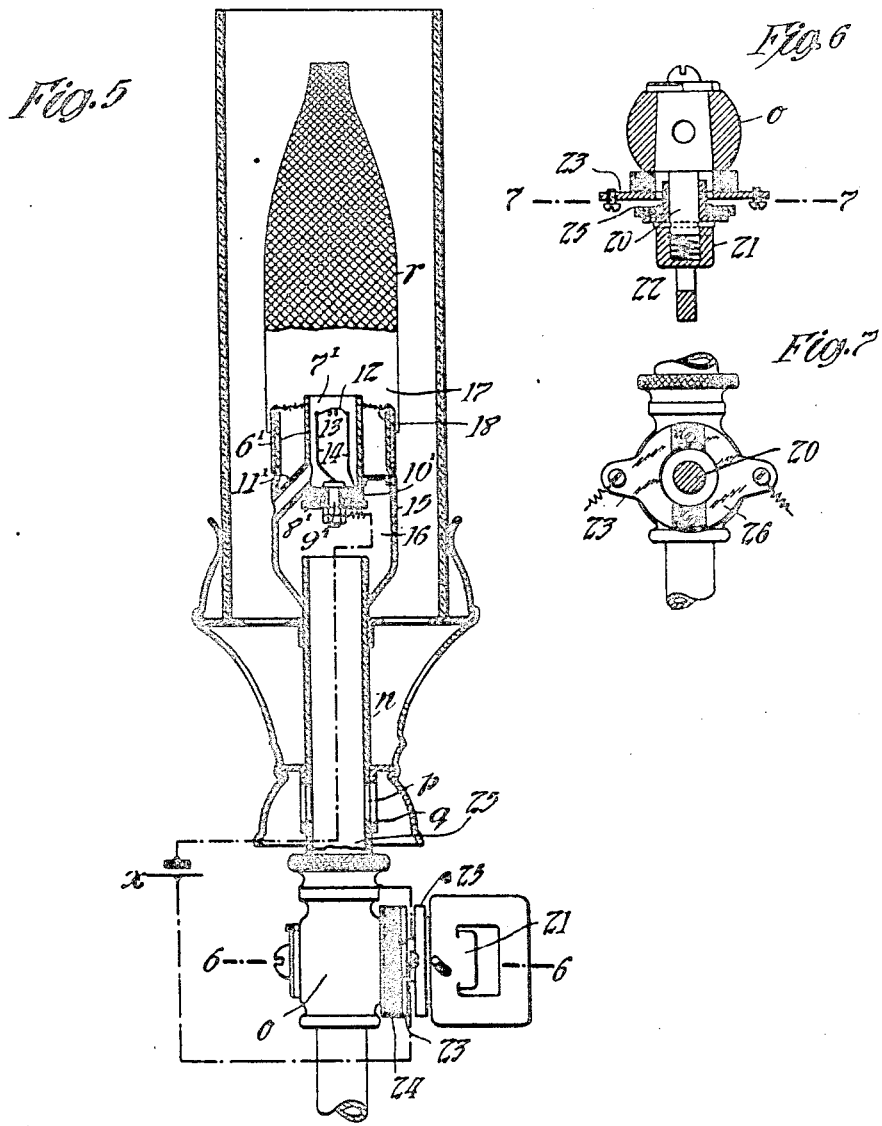

HOWARD LYON, OF GLOUCESTER CITY, NEW JERSEY, ASSIGNOR TO WELSBACH LIGHT COMPANY, OF GLOUCESTER CITY, NEW JERSEY, A CORPORATION OF NEW JERSEY.

IGNITION APPARATUS.

1,068,681.  Specification of Letters Patent.  Patented July 29, 1913.

Application filed June 5, 1911. Serial No. 631,297.

*To all whom it may concern:*

Be it known that I, HOWARD LYON, a citizen of the United States, and a resident of Gloucester City, in the county of Camden and State of New Jersey, have invented certain new and useful Improvements in Ignition Apparatus, of which the following is a description.

My invention relates to apparatus for the ignition of illuminating gas or combustible vapor.

At the present time the ignition of gas lamps situated out of doors or in exposed positions is attended with great difficulty due to the presence of strong air currents and wind which cool the filament or other ignition means or blow the gas away from it to such an extent that it has been a practical impossibility to use a catalytic or a hot wire igniter, reliance being had on constantly burning pilots which however are uneconomical on account of the substantial quantities of gas consumed thereby.

The present apparatus has been devised more particularly with reference to providing an igniter preferably of the hot wire type and capable of reliable operation in all kinds of weather, including winds of great velocity, and being equally well adapted for use indoors and all sheltered places.

In order that the invention may be more fully understood, reference is hereby made to the accompanying drawings, of which—

Figure 1 is a side elevation of a five burner lamp, partly in section, on line 1—1 of Fig. 2. Fig. 2 is a bottom plan of the same. Fig. 3 is a plan and Fig. 4 a vertical axial section of the igniter of Figs. 1 and 2. Fig. 5 is a vertical axial section of a single burner lamp of the upright type and equipped with my invention. Fig. 6 is a section on line 6—6 of Fig 5, and Fig. 7 is a section on line 7—7 of Fig. 6.

The lamp shown in Figs. 1 and 2 is, except for the ignition means, of well known form and comprises five burner heads *a* depending from a deck plate *b* and supporting inverted incandescent mantles *c*. The burner heads are supplied with gas from the central Bunsen tubes *d* radiating from a central supply pipe *e* by which the lamp is supported, each Bunsen tube having the usual gas check and air inlets (not shown). Above the burner heads *a* and in staggered relation thereto are the five flues or stacks *h* which have outlets (not shown) near the top of the lamp. A globe holder *i* is also provided for supporting a hemispherical globe (not shown), the interior of the lamp being supplied with atmospheric air through the gauze *k*.

The igniter comprises a body 1 having a nipple 2 in which is secured the lower end of a supply pipe 3. Within said body is an annular chamber 4 supplied with gas by the pipe 3 and having a narrow annular outlet 5 at its upper end. Arranged within and concentric with the body 1 is a tubular member 6 of metal within which is an ignition chamber 7, the top of which is open and the bottom closed by a shouldered plug 8 of porcelain, fiber or other suitable insulator within which is mounted a conducting bolt 9. A conductive sleeve 10 is also mounted on the insulating plug 8 and is in close contact with the bore of the tube 6. Air inlets 11 are formed in the tube 6 as shown. A conducting filament 12 of platinum or platinum alloy of minute cross section is supported at its ends by leading in wires 13 and 14 respectively, 13 being connected to the conductor 9 and 14 to the sleeve 10. This filament is preferably formed with a two or three turn helix at its center as disclosed in my application Serial No. 585,772, filed October 7, 1910. A suitable source of current such as a single dry cell (not shown) is used for energizing the filament 12 whenever ignition of the lamp is desired, any suitable switch being employed for the purpose and which may be combined with the cock *m* or mounted at a distance from the lamp in any well known manner, the switch serving to open the circuit as soon as ignition has occurred.

In the operation of the apparatus, the cock *m* is turned to admit gas to the burner heads *a* and pilot tube 3. Gas issues from the outlet 5 in a thin annular stream which entrains air from the chamber 7 and through the inlets 11, causing the filament 12 to be bathed in atmospheric air. The stream of gas tends to diffuse and a small percentage thereof finds its way into the upper portion of the chamber 7 and into the vicinity of the filament 12 whereby an ignitible mixture is formed and surrounds the said filament. Upon closing the switch, an electric current is passed through the filament, which current is preferably of a strength insufficient of itself to heat the filament to the kindling temperature of the gas, but is sufficient to initiate catalytic action, one dry cell being sufficient for this purpose. The catalytic action of the gas upon the electrically heated filament very quickly raises it to a high temperature and ignition at once takes place, the resultant explosion igniting all the gas in the lamp which thereafter burns at all of the burner heads $a$ in the usual manner. The electric current is then cut off, while the jet from outlet 5 may be allowed to burn, as its consumption is negligible compared with that of the lamp proper, the pilot being shut off by the cock $m$ whenever the lamp itself is extinguished.

The operation of the apparatus described is not affected by the presence of strong drafts and air currents from the outside because the upper end of the ignition chamber 7 is surrounded by a current of gas, therefore a breeze from any direction is not only unable to blow all of the gas away from the ignition chamber but must of necessity blow some gas into the chamber, so that in practice the presence of such extraneous currents of air expedites rather than hinders the process of ignition. This is also true of the apparatus of Fig. 5 which will be now described. The lamp shown comprises a Bunsen tube $n$ mounted on a supply cock $o$ and having air inlets $p$ controlled by a shutter $q$. A burner head 15 is mounted on the upper end of the Bunsen tube $n$ and contains a mixing chamber 16 having an outlet 17 of annular form protected by a gauze 18. Within and concentric with the burner head 15 is a tubular member 6' of metal within which is an ignition chamber 7', the top of which is open and the bottom closed by a shouldered plug 8' of suitable insulating material within which is mounted a conducting bolt 9'. A conductive sleeve 10' is also mounted on the insulating plug 8' and is in close contact with the bore of the tube 6'. An air inlet tube 11' extends from the base of the chamber 7' to the exterior of the burner head 15 so as to provide for the admission of atmospheric air to the said chamber 7'. The leading in wires 13 and 14 and conducting filament 12 are the same as have been previously described, and the latter is energized in the same way, as by a dry cell $x$. The cock comprises a body $o$ and a key upon whose shank 20 is mounted a sleeve 21 having a limited movement thereon by reason of a pin and slot connection between the two. The contacts 23 and 26 are connected respectively to one pole of the battery $x$ and to the body of the cock or ground. These contacts are mounted on an insulator 24 carried by the cock. The contacts 23 and 26 are so placed as to be engaged by a contact disk 25 on said sleeve 21 when the cock is held open during the ignition period, thereby closing the circuit through the igniter. The circuit is automatically opened when the hand is removed from the key by reason of the spring 22 which moves the sleeve 21 into the position shown in Fig. 6. This spring is a left handed spiral or helix, whereas the movement of the key 20 and sleeve 21 by which the circuit is closed is right handed. By reason of this right handed motion against a left handed spring, the release is made much more positive.

The operation of the device of Fig. 5 is similar to that of Figs. 1 and 2. The cock $o$ having been opened, gas is permitted to fill the burner head and lamp and at the same time the electrical circuit is completed through the filament 12. Some of the gas which surrounds the ignition chamber 7' finds its way into the same through the open end thereof, and mixing with the air therein contained, produces an ignitible mixture which surrounds the filament. The latter is heated by the electric current to a sufficient extent to initiate catalytic action with respect to the mixture. Such catalytic action very quickly raises the filament to a high temperature and ignition takes place resulting in the explosion of the gas in the lamp which thereafter burns at the burner head in the usual manner. The cock $o$ is then liberated and the circuit is immediately opened by reason of the action of the spring 22, as has been described. In this structure the filament is protected from outside air currents not only by the wall of the ignition chamber 7' and the annular current of gas which surrounds the same, but also by the mantle $r$ of the lamp which is mounted in any well known manner and surrounds the burner head as shown.

Having now described my invention, what I claim is:

In a gas lamp, a burner having an outlet or outlets in the form of an annulus, an ignition chamber below said outlet or outlets and having an opening surrounded thereby, an air inlet for said chamber, and ignition means situated entirely within said chamber, the arrangement being such that the ignition chamber receives gas only by way of said opening, substantially as set forth.

This specification signed and witnessed this 31st day of May 1911.

HOWARD LYON.

Witnesses:
J. H. JOHNSON,
O. T. DUCEY.